Patented July 5, 1949

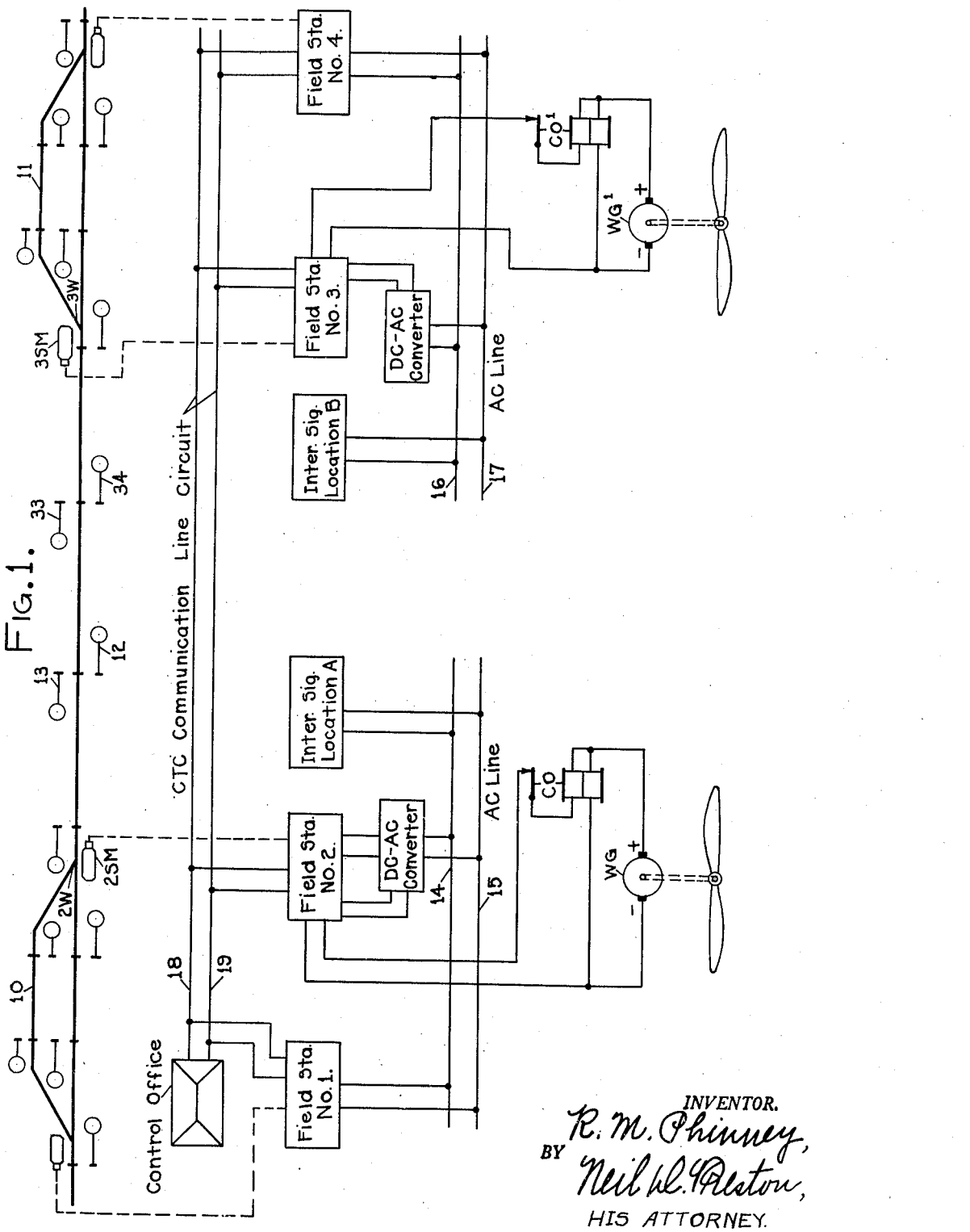

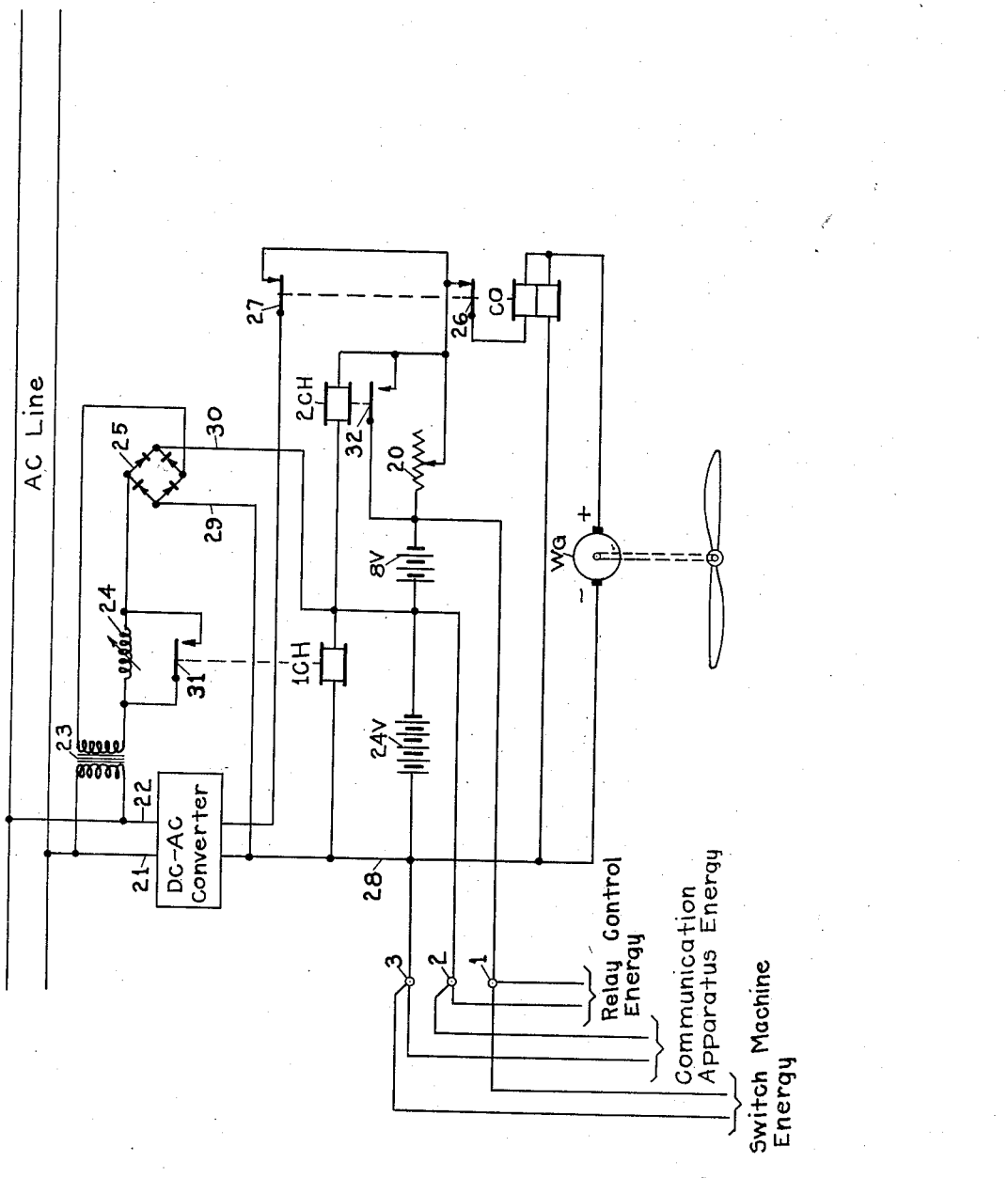

2,475,252

UNITED STATES PATENT OFFICE 2,475,252

POWER SUPPLY SYSTEM

Robert M. Phinney, Rochester, N. Y., assignor to General Railway Signal Company, Rochester, N. Y.

Application November 21, 1946, Serial No. 711,429

4 Claims. (Cl. 290—44)

This invention relates to power supply systems for railroads and it more particularly relates to a system for the the intermittent charging of a plurality of different voltage storage batteries at different charging rates from a single source of direct current supply voltage.

In a centralized traffic control system for railroads of the general character disclosed in the patent to T. J. Judge, No. 2,350,620, dated June 6, 1944, for example, power track switches and signals along the trackway are energized by local storage batteries in accordance with respective switch and signal control codes communicated from a distant control office, and the operation of such switches and signals is indicated at the control office by the transmission of indications of such operation over a code communication system. It is thus provided that at least three different voltages may necessarily be supplied in the field by the local batteries, one for the energization of local signal control relays, one for the operation of a power switch machine, and one for the energization of code communication system apparatus. The storage batteries are ordinarily maintained charged by constant charge rectifiers energized from an alternating current power transmission line.

An object of the present invention is to make use of such system as is described above in territory where alternating current power from a central source is not available for charging the batteries by the use of wind generators at respective points conveniently called field stations along the trackway, an alternating current transmission line being provided for feeding intermediate signal locations between the field stations. Such line circuit obtains its energy from a direct current wind generator through a suitable converter for improving the efficiency of transmission over the line circuit by the use of a higher voltage for transmission than is employed for charging the batteries.

Another object of the present invention is to charge a plurality of batteries in series by the output voltage of the wind generator and apply an additional charge to one of the batteries by rectifying the alternating current output of the converter.

Other objects, purposes and characteristic features of the present invention will be in part obvious from the accompanying drawings and in part pointed out as the description of the invention progresses.

In describing the invention in detail, reference is made to the accompanying drawings in which like reference characters designate corresponding parts and like letter reference characters are used to designate similar parts which are made distinctive by preceding numerals indicative of the particular location with which such parts are associated, and in which:

Fig. 1 illustrates schematically the organization of a power supply system as one embodiment of the present invention for use with a centralized traffic control system; and Fig. 2 illustrates the means employed according to the present invention for charging the storage batteries at a typical field station and applying energy to the alternating current line circuit extending to an intermediate signal location.

With reference to Fig. 1, a track layout is illustrated to which this embodiment of the present invention is applied, such track layout comprising a stretch of single track having the passing sidings 10 and 11 associated therewith. A power switch machine SM is provided at each end of the passing sidings for operating the track switch W connecting that passing siding to the main track. Thus the switch machine 2SM, for example, is provided for operating the track switch 2W, and the switch machine 3SM is provided for operating the track switch 3W.

The control apparatus provided at each end of each passing siding for controlling the respective switches and signals at that point is said to constitute a field station, and each of the field stations is connected to a communication line circuit which extends from a control office to the end of the territory which is subject to control by the control office dispatcher, or operatior.

For a more complete disclosure of the mode of operation of the system for controlling the switches and signals, reference is to be made to the above mentioned patent to T. J. Judge. For an understanding of the present invention, however, it is believed sufficient to consider each of the field stations as illustrated in block form in Fig. 1 as comprising code transmitting and receiving apparatus for transmitting indications to the control office as to the conditions of switches and signals and other devices at that field station, and for receiving and decoding control codes transmitted from the control office to that field station to provide for the control of the track switch and signals at that field station as designated by the control machine operator, subject to automatic control dependent upon the condition of occupancy of the respective track sections with which the switch and signals are associated.

Intermediate signals, such as the signals 12 and 13 are located as required by the spacing of the passing sidings. Such signals are subject to track circuit control and are controlled in accordance with the condition of the next signal in advance as required in practice.

The signal and track circuit control apparatus at each of the intermediate signals is illustrated in Fig. 1 by a block located opposite the signals with which such apparatus is associated, and the intermediate signal location A is illustrated as deriving its power from an alternating current transmission line having wires 14 and 15 extending to field station No. 2. Similarly the intermediate signal location B is designated as deriving its power from the alternating current transmission line having wires 16 and 17 extending to field station B. It will be noted that the intermediate signal locations A and B have no connection with the CTC line circuit comprising wires 18 and 19, and therefore these locations require only relatively low battery voltages such as those required for relay line circuits, the energization of the signals and the energization of the track circuits.

Considering more specifically the organization of the storage batteries employed at a field station for providing different voltages for different functions of the system, reference is made to Fig. 2 which shows the power supply provided by the present invention for a typical field station. It is provided that a relatively low voltage battery such as the battery 8V is provided for the energization of relay control circuits, and such battery is connected in series with a higher voltage battery such as a battery 24V which is used primarily for the energization of code communication apparatus. The combination of the two batteries in series provides a proper supply voltage for the power operation of the switch machine SM at that field station. Thus it is provided that the relay control voltage can be obtained across the terminals 1 and 2; the voltage for energization of the code communication apparatus can be obtained across the terminals 2 and 3; and the voltage for operation of the switch machine can be obtained across the terminals 1 and 3.

A direct current wind generator WG is provided at each of the field stations for supplying a charging voltage for the batteries, and the wind generator WG is connected to the batteries selectively by the cut-out, or reverse current, relay CO to allow its connection to the batteries only when its voltage is high enough for charging.

A resistor 20 is connected in series with the batteries for limiting the rate of charge, and such resistor is selectively shunted out by the charge control relay 2CH in accordance with whether or not a high rate of charge is desirable.

The D. C.-A. C. converter is energized by the output of the wind generator WG, and the output wires 21 and 22 of the D. C.-A. C. converter are connected to the A. C. transmission line extending to one or more adjoining signal locations.

Connected to the output terminals of the D. C.-A. C. converter is a rectifier comprising a transformer 23, an inductance 24 and a full wave rectifier unit 25. The output of the rectifier provides a charging voltage for the battery 24V in addition to the charge which is provided for that battery by its series connection with the battery 8V across the wind generator WG. The relay 1CH governs the rate of charge of the battery 24V from the rectifier by selectively shunting the inductance 24 in the rectifier input circuit.

Having thus considered the general organization of the apparatus provided for this embodiment of the present invention consideration will now be given more specifically as to the circuit organization and the mode of operation of the system.

When the wind generator WG turns at a sufficient speed to produce a charging voltage for the batteries 24V and 8V connected in series, the energization of the lower winding of the relay CO by an obvious circuit connected directly across the positive and negative terminals of the wind generator WG, causes the relay CO to be picked up. The picking up of the relay CO closes a charging circuit for the batteries 24V and 8V extending through the upper winding of that relay. Such circuit extends from the positive terminal of the generator WG through the upper winding of relay CO, front contact 26 of relay CO, resistor 20, battery 8V and battery 24V to the negative terminal of the wind generator WG. By this circuit a charge is maintained for the batteries 24V and 8V at a rate limited by the resistor 20.

The wind generator WG also provides energy for the D. C.-A. C. converter when the relay CO is picked up. The positive terminal of the wind generator WG is connected to an input terminal of the converter D. C.-A. C. through the upper winding of the relay CO, front contact 26 of relay CO, and front contact 27 of relay CO. The negative terminal of the wind generator WG is connected to the other input terminal of the converter D. C.-A. C. by the wire 28. The inclusion of front contact 27 of relay CO in the input circuit for the converter D. C.-A. C. disconnects the converter from the batteries 24V and 8V as well as from the wind generator WG when the voltage of the generator WG is too low for charging.

The primary winding of the transformer 23 is connected across the output wires 21 and 22 of the D. C.-A. C. converter, and the secondary winding of the transformer 23 is connected across the input terminals of the rectifier unit 25 through the variable inductance 24. The output of the rectifier unit 25 is connected by the wires 29 and 30 across the respective negative and positive terminals of the battery 24V. By this arrangement the battery 24V receives a charge from the rectifier 25, and in addition it receives a charge from the wind generator WG by its connection in series with the battery 8V and the resistor 20 across the output terminals of the wind generator WG. This is required because of the heavier load carried by the battery 24V than the battery 8V.

When the battery 24V approaches its full charge, the relay 1CH, which has its winding connected across the terminals of that battery, is picked up, and the picking up of such relay opens an obvious shunt including contact 31 around the inductance 24 which when closed provides a higher charging rate for the battery 24V.

From the circuit organization which has just been described it will be apparent that the batteries 24V and 8V are selectively charged at a high or a low rate, independent of each other, and that the battery 24V receives a minimum charge equal to the minimum charging rate of the battery 8V, plus the charging rate of the rectifier 25 with the relay 1CH picked up to allow the inductance 24 to limit the input voltage to the rectifier unit 25. The maximum rate of charge for the battery 24V is equal to the maximum charging rate of the battery 8V, as obtained when the back contact 32 of relay 2CH is closed to shunt the resistor 20, plus the charging rate of the rectifier 25 when the relay ICH is dropped away to close the back contact 31 to shunt the inductance 24 out of the input circuit for the rectifier unit 25.

It is to be understood that the present invention is not limited in its application to track layouts which are not serviced by a power supply from a central station, but that there are particular advantages to the use of the organization as disclosed in this embodiment of the present invention as compared to the use of a power line energized from a central station. According to the present invention a continuous power line is not required in that there is no line connection required between the two intermediate signal locations serviced by the respective adjacent wind generator supply systems. Thus the wires 14 and 15 need extend to the right only as far as the intermediate location of signals 12 and 13, as the intermediate signals 33 and 34 are provided with power by the wires 16 and 17 which are energized by the power supply of the wind generator WG¹. By this organization, not only is there a saving in the amount of line wire required, but by requiring the transmission of power only short distances at relatively light loads on any pair of transmission line wires according to the present invention, it is provided that a substantial saving is involved in the use of transmission line wire of considerably smaller size than would be required to supply the same load with power from a central source.

It is also to be understood that the number of batteries which are subject to charge by the wind generators, and the relative voltages of such batteries varies in accordance with the requirements of practice from the specific example of this embodiment.

Having thus described a specific power supply system for railroads as one embodiment of the present invention, it is desired to be understood that this form is selected to facilitate in the disclosure of the invention rather than to limit the number of forms which the invention may assume, and it is to be further understood that various adaptations, alterations and modifications may be applied to the specific form shown to meet the requirements of practice without in any manner departing from the spirit or scope of the present invention except as limited by the appending claims.

What I claim is:

1. In combination, a direct current wind generator, a cut-out relay having its pickup winding energized by the output of said wind generator, a plurality of storage batteries connected in series to the output terminals of said wind generator through a front contact and a winding of said cut-out relay, a direct current to alternating current converter having its direct current input connected to the output of said wind generator, said converter being disconnected from said battery and said wind generator by the dropping away of said cut-out relay, and a rectifier energized by the output of said converter, said rectifier having its output terminals connected across a particular one of said batteries.

2. In a signaling system of the character described, a power supply comprising a direct current wind generator two storage batteries and a resistor connected in series across the output terminals of said wind generator, a direct current to alternating current converter having its input terminals connected across the output terminals of said wind generator, a rectifier energized by the output of said converter and having its output terminals connected across one of said batteries, a rate of charge control relay connected across the other of said batteries in series with said resistor, said relay being picked up when said other battery becomes nearly fully charged, and circuit means for shunting said resistor when said relay is dropped away.

3. A power supply system comprising in combination, a direct current wind generator, a plurality of batteries connected in series to the output terminals of said wind generator, a direct current to alternating current converter connected to the output terminals of said wind generator, and a full wave rectifier energized by the alternating current output of said converter, said rectifier having its direct current output terminals connected across one of said batteries so as to increase the charging rate of that battery over the rate of charge of said batteries directly in series from said wind generator.

4. A power supply system comprising in combination, a direct current wind generator, a cut-out relay, a plurality of batteries connected in series through a contact of said cut-out relay to said wind generator, a direct current to alternating current converter connected to the output terminals of said wind generator through a contact of said cut-out relay, and a full wave rectifier energized by the output of said converter, said rectifier having its direct current output terminals connected across one of said batteries so as to increase the charging rate of that battery over the rate of charge of said batteries in series as connected to said wind generator.

ROBERT M. PHINNEY.

REFERENCES CITED

The following references are of record in the file of this patent:

UNITED STATES PATENTS

| Number | Name | Date |
|---|---|---|
| 1,120,148 | Hull | Dec. 8, 1914 |
| 1,316,738 | Phinney et al. | Sept. 23, 1919 |
| 1,327,682 | Ogden | Jan. 13, 1920 |
| 1,520,793 | Young | Dec. 30, 1924 |
| 1,741,007 | Bettison | Dec. 24, 1929 |
| 1,778,793 | Constantin | Oct. 21, 1930 |
| 1,916,316 | Holden | July 4, 1933 |
| 1,967,801 | Woodbridge | July 24, 1934 |
| 1,967,802 | Beedle | July 24, 1934 |
| 2,152,576 | Weeks | Mar. 28, 1939 |
| 2,179,962 | Scott | Nov. 14, 1939 |